United States Patent [19]
Cook

[11] 3,787,618
[45] Jan. 22, 1974

[54] CATHODE RAY TUBE DISPLAY DEVICE INCLUDING TEST PROBE ADAPTER

[75] Inventor: Harold D. Cook, Wheaton, Ill.
[73] Assignee: Teletype Corporation, Skokie, Ill.
[22] Filed: Oct. 24, 1972
[21] Appl. No.: 299,974

[52] U.S. Cl.............. 178/6.8, 178/DIG. 4, 324/88, 340/324 A
[51] Int. Cl............................................ G01r 29/02
[58] Field of Search.. 178/6.8, DIG. 4; 325/67, 363; 324/77, 88; 340/324 A

[56] References Cited
UNITED STATES PATENTS
3,179,883  4/1965  Farrow.................................. 324/73
3,337,684  8/1967  Sadler............................ 178/DIG. 4
3,375,509  3/1968  Mullarkey...................... 340/324 A
3,522,597  8/1970  Murphy.......................... 340/324 A

*Primary Examiner*—Howard W. Britton
*Attorney, Agent, or Firm*—W. G. Dosse & J L. Landis

[57] ABSTRACT

A system for using the video amplifier and the X and Y axis raster scanning circuits of a CRT display device in conjunction with a measuring probe to form a Z-axis oscilloscope observing the output of intermediate signals in the CRT display logic circuit in order to obviate a separate service-man-supplied oscilloscope.

2 Claims, 1 Drawing Figure

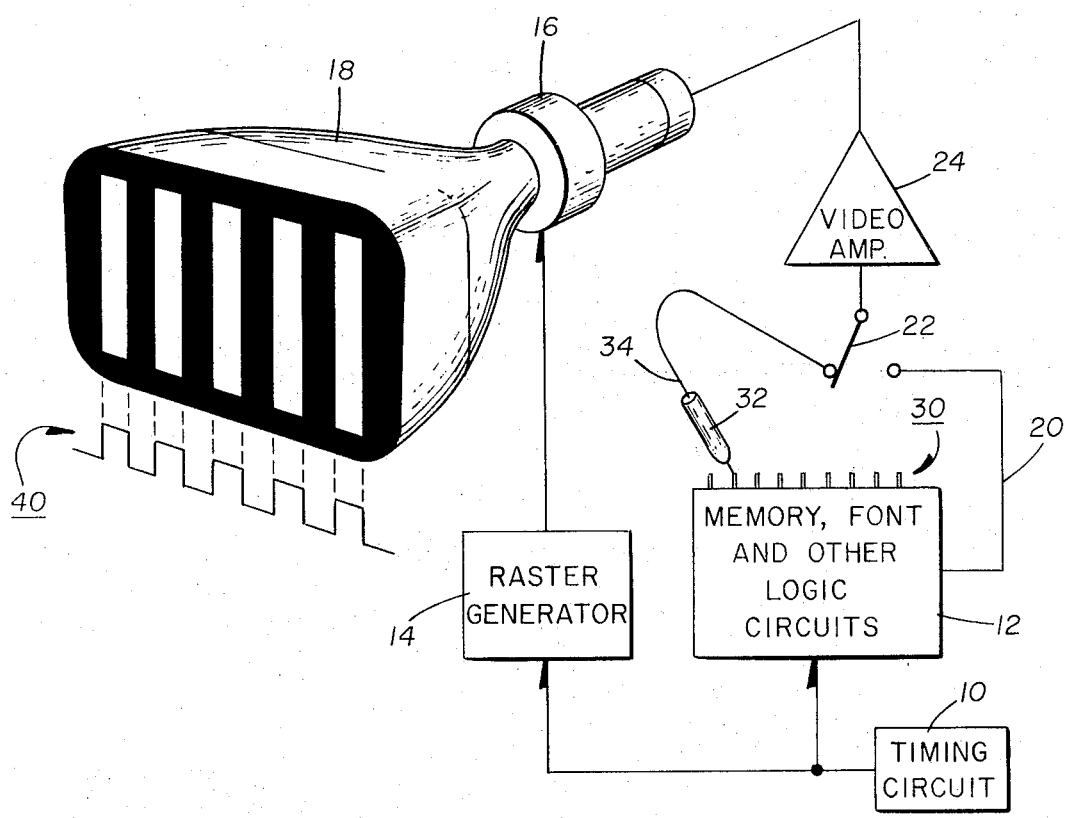

CATHODE RAY TUBE DISPLAY DEVICE INCLUDING TEST PROBE ADAPTER

FIELD OF THE INVENTION

The present invention relates to cathode-ray-tube display devices and more particularly to apparatus and methods for self testing the internal logic circuitry of the cathode-ray-tube display.

BACKGROUND OF THE INVENTION

In order to display the internal waveforms of a cathode-ray-tube display device, it is universal practice to use a separate oscilloscope which has a common ground connected to the ground of the cathode-ray-tube device. The synchronization controlling circuit of the oscilloscope is connected to some timing signal in the display device, and a sampling or test probe connected to the input amplifiers of the oscilloscope is then used to probe the many logic circuits of the CRT display device.

However, such display devices may be widely dispersed in an urban or suburban area and servicing these devices may require that the serviceman carry with him a small oscilloscope in order to trouble-shoot or test a display device in its operating environment. These compact servicing oscilliscopes are expensive, somewhat bulky, and heavy, thereby making extra work for the serviceman or limiting the amount of other materials which he can carry with him on a service call. In addition, the high cost and value of these servicing oscilloscopes makes their use and transportation excessively dangerous for a serviceman in many urban environments.

Therefore, it is an object of the present invention to obviate a separate oscilloscope in the servicing of complex electronic logic circuitry associated with cathode-ray-tube display device.

It is a further object of the present invention to minimize the need for external equipment in servicing cathode-ray-tube display devices.

It is another object of the present invention to provide each cathode-ray-tube display device with the means for its own oscilloscope display.

SUMMARY OF THE INVENTION

In accordance with the present invention, a cathode-ray-tube display device has timing circuits, deflection circuits, logic circuits, and at least one video amplifier connected to a cathode-ray-tube. The video amplifier is disconnected from the logic circuitry and is connected to a test probe in order to use the video amplifier and the X-Y deflection raster system of the cathode-ray-tube to provide an oscilloscope trace representative of the voltages at selected internal test points of the logic circuit, which are manually sampled with the test probe.

BRIEF DESCRIPTION OF THE DRAWING

The present invention will be more readily understood by referring to the following detailed description when considered in conjunction with the accompanying drawing which shows in schematic form the basic portions of a cathode-ray-tube display system. A test probe is shown using the video system of the display device in order to display the internal voltages of the logic circuits of the display device.

DETAILED DESCRIPTION

Referring now to the accompanying drawing, a basic schematic block diagram is shown disclosing a cathode-ray-tube display system comparable to that shown and disclosed in U. S. Pat. No. 3,336,587 granted to C. J. Brown on Aug. 15, 1967, and alternatively in U. S. Pat. No. 3,609,749 granted to W. B. McClelland on Sept. 28, 1971. The circuitry of the display system has been combined into a few logic block elements since the internal workings of all of these block elements are very well known to those skilled in the art and are not relevant to the present invention.

In the accompanying drawing, a timing circuit 10 provides a time base for memory, font, and other logic circuits 12 of the display device and also for a raster deflection generator circuit 14 which drives a deflection yoke 16 of a cathode-ray-tube 18. All of these elements operate in a manner well known to those skilled in the art.

The logic circuits 12 ultimately produce a video or Z-axis, brightness, data signal on an output wire conductor 20. The video signal from the logic circuits 12 is normally delivered through a switch 22 to a video amplifier 24 which provides the brightness or Z-axis control to the cathode-ray-tube 18.

In the normal operation of such a display system, data to be displayed on the screen of the cathode-ray-tube 18 are originated in the logic circuit 12 and are displayed on the screen of the cathode-ray-tube 18 by generating blanking and unblanking pulses from the logic circuit 12 and sending these pulses over the conductor 20, through the switch 22 to the video amplifier 24. These pulses are generated in synchronism with the operation of the raster generator 14 which controls the vertical and horizontal sweep of the cathode-ray across the face of the cathode-ray-tube 18. This is all accomplished under firm control of the timing circuit 10 which provides a time base for both the raster generator 14 and logic circuits 12.

Most of the circuits within the logic circuits 12 are of a binary nature, that is, the signals are either one voltage or the other representing a binary 0 or a binary 1. Certain of the more important, selected signals within the logic circuits 12 are on conductors that are connected to a plurality of test points 30 which are accessable for servicing and monitoring in order to trouble-shoot or analyze the logic circuit 12 in the event of a malfunction.

Within the cabinet of the display device, a test probe 32 is provided having an output conductor 34 connected to one of the terminals of the switch 22. In order to display the signals present on any given test point 30, a serviceman need merely change the switch 22 so as to disconnect the conductor 20 from the video amplifier 24 and connect the conductor 34 to the video amplifier 24. The probe 32 could be any means for interconnecting the test points 30 with the conductor 34, even a series of switches.

Since the signals present at the test points 30 are almost uniformly of a binary nature, the video amplifier and the output of the test probe can readily be balanced such that, for example, a binary 0 causes a dark spot on the cathode-ray-tube screen as results from a blanking signal on the conductor 20. Conversely, a binary 1 causes a light spot on the cathode-ray-tube screen similar to that caused by a unblanking signal on the conductor 20.

Therefore, upon application of the test probe 32 to a test point 30 of the logic circuits 12, the operator can observe the cathode-ray-tube screen. Binary 0 signals appear as dark spots on the screen and binary 1 signals appear as bright spots on the screen.

A sample waveform 40 of a tested signal is shown in the common two-dimensional configuration of a binary voltage signal as it appears on a conventional oscilloscope. The corresponding time-referenced tested signal is shown on the screen of the cathode-ray-tube 18 as it would appear as a Z-axis signal representation in accordance with the present invention.

To simplify the training of service personal, it is possible to provide a serviceman with a picture of what the screen of the cathode-ray-tube 18 should show for each of the many test points 30. In this way, the serviceman need merely compare the observed trace of the cathode-ray-tube display with the published cathode-ray-tube trace furnished in his kit for the corresponding test probe location. If the pictures correspond, the circuit is functioning properly. If the pictures do not correspond, the serviceman will immediately know from the published material which circuit is defective. He can then replace that defective circuit with a minimum of difficulty.

Although various specific embodiments of the invention are shown in the drawings and described in the foregoing specification, it will be understood that invention is not limited to the specific embodiments described, but is capable of modification and rearrangement and substitution of parts and elements without departing from the spirit of the invention.

I claim:

1. A method of displaying the internal operation of a cathode-ray-tube display device having a normal sweep time base, a video amplifier and control circuits by using a test probe, without the use of an external cathode-ray-tube, which comprises:

disconnecting the video amplifier from the control circuits;

connecting the test probe to the video amplifier of the cathode-ray-tube display device; and sampling the internal signals of the control circuits of the cathode-ray-tube device with the test probe, thereby displaying the internal signals of the control circuit on the cathode-ray-tube display screen using the normal sweep time base of the cathode-ray-tube display device.

2. A self-testing apparatus for a cathode-ray-tube display device having means for producing a time base for the display device, deflection circuitry for controlling the deflection of the cathode-ray-beam, means for amplifying the video signals for the cathode-ray-tube and means responsive to the timing means and to input data signals or delivering these data signals to the video amplifying means for display on the screen of the cathode-ray-tube, wherein the improvement comprises:

a plurality of accessible test points in the control circuitry, said test points connected to the internal control circuitry and carrying timing, control, and data signals present in the control circuitry;

manually operable test probe adapted for use with the test points of the control circuitry for monitoring the signals present thereon without altering the nature of the signal; and means for disconnecting the video amplifying means from the control circuitry and for connecting the video amplifying means to the output of the signal probe.

* * * * *